United States Patent [19]

McGrew et al.

[11] Patent Number: 5,234,552
[45] Date of Patent: Aug. 10, 1993

[54] GLYCOL REBOILER VAPOR CONDENSER

[76] Inventors: Robert McGrew, P.O. Box 367, Highway 35 S.; John P. Broussard, 401 S. Irving St., both of Kaplan, La. 70548

[21] Appl. No.: 757,171

[22] Filed: Sep. 10, 1991

[51] Int. Cl.$^5$ ............................................. B01D 5/00
[52] U.S. Cl. ......................................... 203/18; 55/220; 55/222; 159/47.1; 159/DIG. 16; 202/182; 202/185.2; 202/254; 203/98; 203/100; 261/118; 261/152
[58] Field of Search .................. 203/18, 39, 98, 100, 203/91; 202/185.2, 205, 254, 191, 182; 159/47.1, DIG. 16; 55/32, 220, 222; 165/104.34, 104.21; 261/118, 152

[56] References Cited

U.S. PATENT DOCUMENTS

| | | | |
|---|---|---|---|
| 2,573,807 | 11/1951 | Piros et al. | 203/DIG. 2 |
| 3,105,748 | 10/1963 | Stahl | 203/18 |
| 3,347,019 | 10/1967 | Barnhart | 55/32 |
| 3,443,623 | 5/1969 | Sinex | 55/32 |
| 3,648,434 | 3/1972 | Gravis, III et al. | 55/32 |
| 3,824,177 | 7/1974 | Honerkamp et al. | 55/32 |
| 3,914,115 | 10/1975 | Parker, Sr. | 55/32 |
| 4,332,643 | 1/1982 | Reid | 202/176 |
| 4,364,750 | 12/1982 | Koncz | 55/222 |
| 4,377,132 | 3/1983 | Koog et al. | 55/222 |
| 4,574,062 | 3/1986 | Weitman | 55/222 |
| 5,084,074 | 1/1992 | Beer et al. | 55/32 |
| 5,141,536 | 11/1991 | Schievelbein et al. | 55/32 |

Primary Examiner—Virginia Manoharan
Attorney, Agent, or Firm—Richard C. Litman

[57] ABSTRACT

A vapor condensor connected to a glycol reboiler to prevent emissions of aromatic compounds from glycol dehydration from escaping into the atmosphere. Steam and vaporized hydrocarbons are directed into the vapor condenser where they are sprayed with 80 degree or below Fahrenheit water. The water spray cools the steam and vaporized hydrocarbons so that a substantial portion of the vapors are changed to a liquid phase which is collected in an accumulator located below the vapor condenser. A water jacket surrounding a central cylinder of the vapor condenser tends to keep the condensed vapors in the liquid phase. The remaining vaporized hydrocarbons which are not condensed are drawn out of the accumulator and burned in a burner connected to the glycol reboiler. The steam and vaporized hydrocarbons in the glycol reboiler have an initial temperature in range of 350 to 400 degrees Fahrenheit.

8 Claims, 2 Drawing Sheets

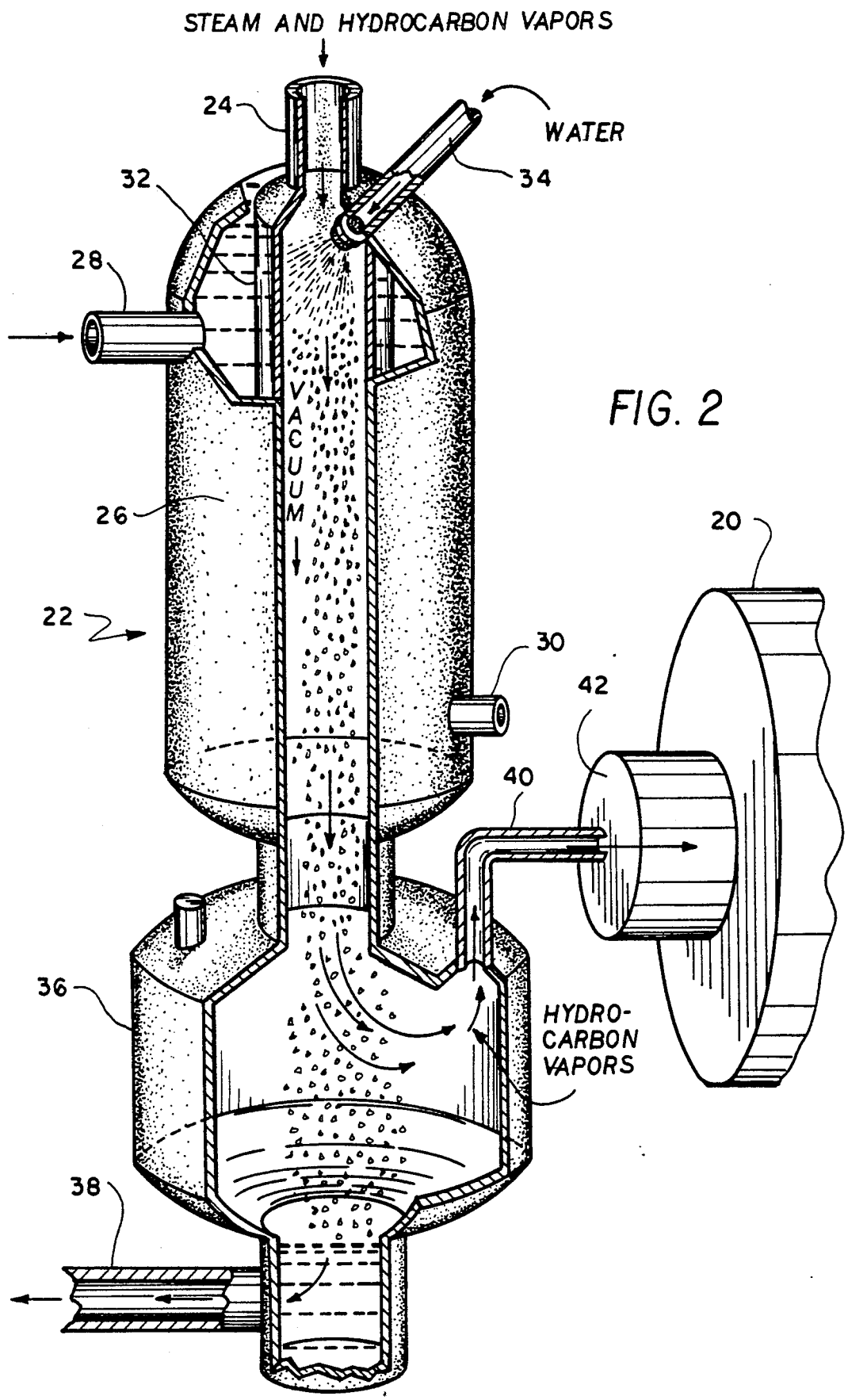

GLYCOL REBOILER VAPOR CONDENSER

BACKGROUND OF THE INVENTION

1. Field Of The Invention

This invention is directed to a device to prevent the emission of aromatic compounds into the atmosphere during glycol dehydration. Such emissions include water and hydrocarbons as liquids in vapor form.

Glycol is normally used as a hydrate inhibitor or desiccant during treatment of well gas. Subsequent to such use, glycol is regenerated in a glycol reboiler or reconcentrator in a process that yields large emissions into the atmosphere of water and hydrocarbons in vapor form. This invention enables the recapture of these compounds in liquid form and the burning of the excess vapors when deemed necessary, though a cooling process involving the spraying of cooling water directly on the heated emissions so as to condense major portions of the vapor; while enabling the burning of the remaining portion of the vapor.

2. Description of Related Prior Art

The broad concept of cooling a gas by spraying the gas with cooling water is well known in the prior art. U.S. Pat. No. 2,249,621, issued Jul. 15, 1941 to Peter Schlumbohn, U.S. Pat. No. 1,330,920, issued Feb. 17, 1920 to Alfred E. Stacey, Jr., and U.S. Pat. No. 2,653,012, issued Sep. 22, 1953 to Charles J. Thatcher, disclose arrangements primarily directed to air conditioning wherein the air is cooled by being sprayed by water. U.S. Pat. No. 3,760,871, issued Sep. 25, 1973 to Michael W. Larinoff, discloses an apparatus for condensing exhaust steam from a steam turbine power plant, wherein the steam is sprayed by cooled condensate of the steam. U.S. Pat. No. 4,287,938, issued Sep. 8, 1981 to Sven G. R. Lagerquist et al. and U.S. Pat. No. 4,928,751, issued May 29, 1990 to Frank P. Fischer et al., discloses heat exchange arrangements wherein hot gases are cooled by spraying the gases with water. U.S. Pat. No. 4,574,062, issued Mar. 4, 1986 to Jacob Weitman, discloses an arrangement for treating contaminated gas involving injecting water into the air flow.

U.S. Pat. No. 2,758,665, issued Aug. 14, 1956 to Alex W. Francis, Jr., teaches the use of glycol as a hydrate inhibitor or desiccant during the treatment of well gases to separate the gas and the hydrocarbons therein, and discloses the use of a glycol reconcentrator to separate the water and glycol to enable reuse of the glycol in the system. Not disclosed, however, is any treatment of aromatic compounds released into the atmosphere during the reconcentration of glycol.

SUMMARY AND OBJECTS OF THE INVENTION

None of the above cited references are concerned with control of the emissions of aromatic compounds created during glycol dehydration.

It is an object of this invention to eliminate the emission of aromatic compounds during the process of dehydrating glycol.

It is a further object of this invention to cool the emission vapors to liquid temperatures whereby the water and hydrocarbons forming the emission vapors may be recaptured and separated, thereby improving environmental quality.

It is another object to burn residual vapors to thereby provide additional fuel for the glycol reboiler without endangering the environment.

The foregoing and additional objects are achieved by rerouting the hydrocarbon and steam emissions from the glycol reboiler to a vapor condenser wherein the vapors are sprayed with water having a temperature of approximately 80 degrees or below Fahrenheit whereby a substantial portion of the vapor emissions are liquefied and collected in an accumulator. The residual vapor is then directed to a burner connected to the glycol reboiler to be burned thereby.

Other objects, features and advantages of this invention will become apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 2 is a perspective view in partial section showing the glycol reboiler vapor condenser.

DETAILED DESCRIPTION OF THE PREFERRED EMBODIMENT

Figure 1:
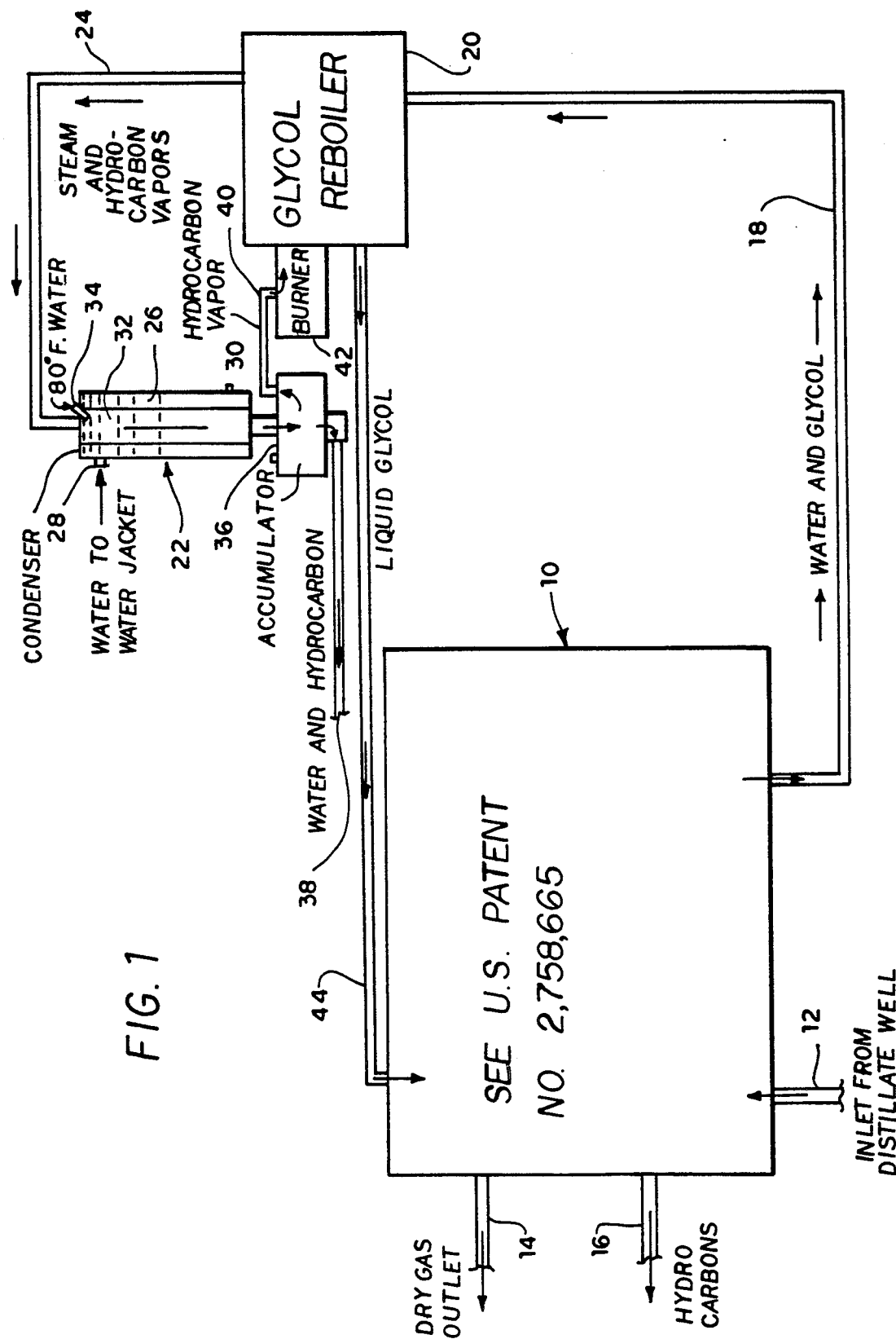
FIG. 1 is a schematic view of a low temperature separation system incorporating the invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

FIG. 1 schematically shows a low temperature separation system 10 such as disclosed by U.S. Pat. No. 2,758,665, issued Aug. 14, 1956 to Alex W. Francis, Jr. Such a system 10 functions to separate usable gas and hydrocarbons coming from a distillate well, the well stream entering system 10 through inlet pipe 12, with the dry gas exiting the system 10 through outlet pipe 14, and the separated hydrocarbons exiting the system 10 through outlet pipe 16.

As discussed in U.S. Pat. No. 2,758,665, it is important that no gas hydrates be allowed to form in the well stream prior to the introduction of the well stream into a low temperature separator. Yet, to obtain maximum liquid recoveries, it may be desirable to cool the well stream below the gas hydrate formation temperature prior to pressure reduction of the well stream. Therefore, if desirable or necessary, a hydrate inhibitor or desiccant such as diethylene glycol, triethylene glycol, calcium chloride solution, and similar materials, may be injected into the well stream. The inhibitor functions to depress the hydrate formation temperature and permits the cooling of the well stream to temperatures much below those possible when no inhibitor is used.

The well stream is then passed through a heat exchanger in which it is cooled to the desired degree by indirect heat exchange with cold gases being exhausted from the low temperature separator. The cooled well stream then flows from the heat exchanger through a conductor to a choke, wherein the pressure of the well stream is reduced considerably and marked chilling or cooling of the well stream occurs in such expansion due to the Joule-Thompson effect. The cold, reduced pressure well stream is then admitted tangentially into a spinner drum which is maintained at a relatively warm temperature.

The pressure reduction and cooling of the well stream results in the condensation of both hydrocarbon and aqueous liquids which settle to the lower portion of the separator. The hydrocarbon or distillate stratum float upon the water or aqueous stratum, and is skimmed off into a sump for withdrawal through a distillate discharge or outlet pipe 16. The water stratum flows along the lower portion of the low temperature separator and is overflowed into a sump from which it is withdrawn through a conductor 18 leading to an inhibitor reconcentrating unit or glycol reboiler 20 for the removal of water and residual hydrocarbons.

In the past, during glycol dehydration or regeneration in the glycol reboiler 20, large emissions of aromatic compounds along with water vapors were released into the atmosphere, to the detriment of the environment. These emissions (water and hydrocarbons) from the glycol reboiler 20 are liquids in vapor form. The temperature of reboiler 20 has to be in the range of 350 to 400 degrees Fahrenheit to separate water form the glycol. The hydrocarbons (benzene, toluene, xylene, ethyl benzene, etc.) escaping into the atmosphere exist as vapors.

The glycol reboiler vapor condenser 22, connected to glycol reboiler 20 by conduit 24, returns the hydrocarbon and water vapors to liquid temperatures by spraying 80 degrees or below Fahrenheit water on them at the entrance to condenser 22 as shown in FIG. 2. Condenser 22 has an external water jacket 26 having 80 degrees or below Fahrenheit water therein and coupled to an inlet conduit 28 and an outlet conduit 30.

The steam and hydrocarbon vapors are introduced into an inner cylinder 32 of condenser 22 by conduit 24 at the top of condenser 22. Also connected to inner cylinder 32 of condenser 22 is an inlet spray conduit 34 which sprays cooling water onto the entering vapors, the water having a temperature of 80 degrees or below Fahrenheit. The cooling of the vapors creates a vacuum within condenser 22 which helps to move the steam and hydrocarbons from reboiler 20 to condenser 22 by relieving pressure. Reboiler 20 is designed to operate at 0 lbs. pressure. If steam back pressure exists on the glycol reboiler 20, the steam is not able to vent from reboiler 20 and will condense with the glycol. This will bring down the purity of the glycol resulting in a high dew point, preventing dehydration of natural gas.

As the vapors condense to the liquid phase, the liquid water and hydrocarbons accumulate at the base of liquid accumulator 36 to be subsequently drawn off through outlet conduit 38. Any remaining hydrocarbon vapors in liquid accumulator 36 are drawn through outlet pipe 40 to burner 42 connected to glycol reboiler 20 where they are burned. The reconcentrated liquid glycol travels from reboiler 20 through conduit 44 to be reintroduced into low temperatures separation system 10.

By directing the emissions from glycol reboiler 20 to vapor condenser 22 and then collecting the liquid condensate and burning the remaining hydrocarbon vapors, the emission into the atmosphere of aromatic compounds from glycol dehydration is prevented.

While is will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

We claim:

1. In a low temperature separation system including a glycol reboiler, a means for controlling emissions of aromatic compounds from glycol dehydration the improvement comprising:
   a vapor condenser means;
   a first conduit means connecting said glycol reboiler to said vapor condenser means whereby steam and vaporized hydrocarbons from said glycol reboiler is directed to said vapor condenser means;
   a second conduit means connected to said vapor condenser means and to a source of liquid water for spraying said steam and vaporized hydrocarbons with liquid water as said steam and vaporized hydrocarbons enter said vapor condenser means thereby to cool said entering steam and vaporized hydrocarbons to a liquid phase;
   an accumulator means located below said vapor condenser means to collect liquid water and liquid hydrocarbons from said condenser means;
   a third conduit means connected to said accumulator means to withdraw said liquid water and liquid hydrocarbons from said accumulator means;
   a fourth conduit means connected between said accumulator means and a burner means connected to said glycol reboiler, whereby remaining vaporized hydrocarbons in the accumulator means are burned by the burner means, and environmentally harmful emissions of aromatic compounds are prevented;
   said vapor condenser means further comprising:
   a centrally disposed cylinder means for receiving said steam, vaporized hydrocarbons and sprayed liquid water;
   a water jacket means surrounding said centrally disposed cylinder means; and
   a fifth conduit means connected to said water jacket means for providing said water jacket means with cooling water.

2. The separation system as in claim 1, wherein:
   said vapor condenser means is vertically disposed;
   said first conduit means is connected to a top end of said vapor condenser means;
   said second conduit means is connected to said top end of said vapor condenser means below and to one side of said first conduit means;
   said steam and said vaporized hydrocarbons entering said vapor condenser means have a temperature in the range of 350 to 400 degrees Fahrenheit; and
   said liquid water for spraying said entering steam and vaporized hydrocarbons has a temperature of approximately 80 degrees Fahrenheit; whereby
   the change from a vapor phase to a liquid phase creates a vacuum in said vapor condenser means aiding the flow of steam and vaporized hydrocarbons from said glycol reboiler to said vapor condenser means.

3. The separation system in claim 2, wherein said fifth conduit means including an inlet conduit and an outlet conduit, and said cooling water in said water jacket means having an approximate temperature of 80 degrees Fahrenheit to keep the condensed vapors at a liquid temperature.

4. The separation system as in claim 1, wherein said fifth conduit means including an inlet conduit and an outlet conduit, and said cooling water in said water jacket means having an approximate temperature of 80 degrees Fahrenheit to keep the condensed vapors at a liquid temperature.

5. In a low temperature separation system including a glycol reboiler and a vapor condenser means for controlling emissions of aromatic compounds from glycol dehydration, said emissions including steam and vaporized hydrocarbons, the improvement comprising:

an internal cylinder means within said vapor condenser means for receiving said steam and vaporized hydrocarbons through a first conduit means connected between said internal cylinder means and said glycol reboiler, the first conduit means is connected to a top end of said vapor condenser means;

means for spraying a cooling water spray onto said steam and vaporized hydrocarbons entering said internal cylinder means including a second conduit means for said cooling water spray connected to said internal cylinder means and to a source of liquid water, said cooling water spray creating a vacuum within said internal cylinder means by cooling said steam and said vaporized hydrocarbons from a vapor phase to liquid phase;

an accumulator means connected to the bottom of said internal cylinder means to collect water and liquid hydrocarbons in said liquid phase;

a third conduit means connected to said accumulator means for withdrawing said collected water and liquid hydrocarbons from said accumulator means;

a fourth conduit means connected between said accumulator means and a burner connected to said glycol reboiler for withdrawing remaining vaporized hydrocarbons from said accumulator means to be burned by said burner; and a water jacket means surrounding said internal cylinder means and provided with cooling water by a fifth conduit means connected to said water jacket means; whereby escape into the atmosphere of emissions of aromatic compounds from glycol dehydration in said glycol reboiler is prevented.

6. The separation system as in claim 5, wherein said fifth conduit means includes an inlet conduit and an outlet conduit, said sprayed cooling water has an approximate temperature of 80 degrees Fahrenheit, and said steam and vaporized hydrocarbons have a temperature in a range of 350 to 400 degrees Fahrenheit.

7. A method of controlling the emission of aromatic compounds from a glycol reboiler, including steam and vaporized hydrocarbons, during glycol dehydration, comprising the steps of:

a) heating used glycol and water in said glycol reboiler to a temperature in the range of 350 to 400 degrees Fahrenheit;

b) directing steam and vaporized hydrocarbons from said glycol reboiler to a centrally disposed cylinder in a vapor condenser by a first conduit;

c) providing said vapor condenser with a cooling water spray through a second conduit connected to a source of liquid water and said centrally disposed cylinder for spraying said steam and said vaporized hydrocarbons to thereby change said steam and said vaporized hydrocarbons to a liquid phase;

d) collecting the water and hydrocarbons in said liquid phase in an accumulator;

e) withdrawing said water and hydrocarbons in said liquid phase from said accumulator through a third conduit;

f) withdrawing the remaining vaporized hydrocarbons from said accumulator through a fourth conduit;

g) providing said vapor condenser with cooling water for a water jacket surrounding said vapor condenser through a fifth conduit; and h) burning said withdrawn remaining vaporized hydrocarbons in a burner connected to said fourth conduit and said glycol reboiler; whereby said emissions of aromatic compounds from glycol dehydration are prevented from escaping into the atmosphere.

8. A method for controlling the emission of aromatic compounds as in claim 7, wherein said cooling water for said water jacket and said cooling water spray have an approximate temperature of 80 degrees Fahrenheit.

* * * * *